(No Model.)
J. LEA.
SEAT FOR VEHICLES.
No. 401,179. Patented Apr. 9, 1889.
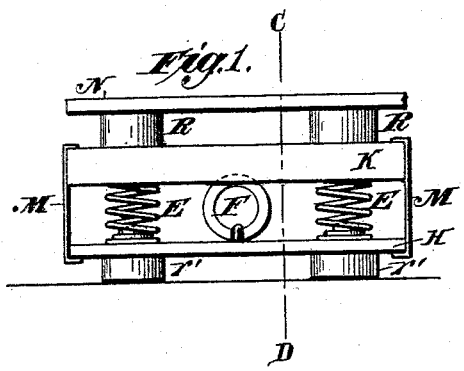
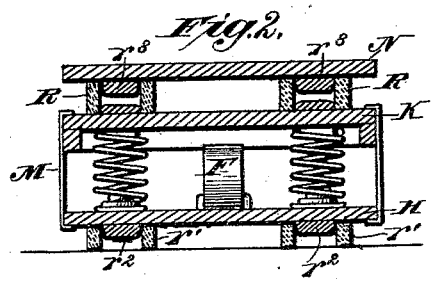
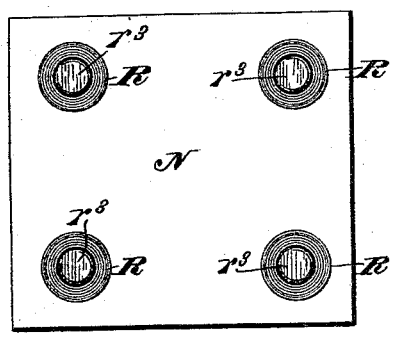
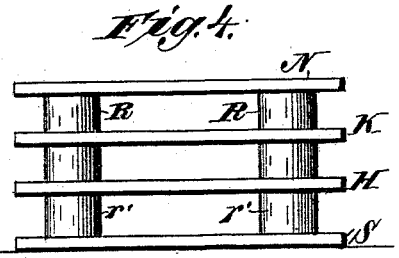
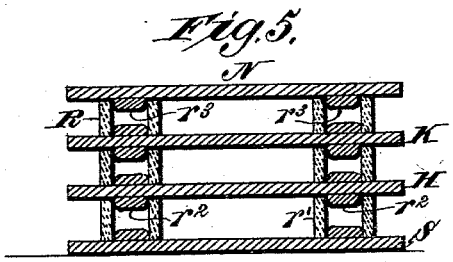
Witnesses,
Robert Everett,
Geo. N. Rea.
Inventor:
James Lea,
By James L. Norris,
Atty.

UNITED STATES PATENT OFFICE.

JAMES LEA, OF FERNLEIGH, NEW ROAD, BROMSGROVE, COUNTY OF WORCESTER, ENGLAND.

SEAT FOR VEHICLES.

SPECIFICATION forming part of Letters Patent No. 401,179, dated April 9, 1889.

Application filed August 8, 1888. Serial No. 282,294. (No model.) Patented in England May 15, 1888, No. 7,202.

*To all whom it may concern:*

Be it known that I, JAMES LEA, a subject of the Queen of Great Britain, residing at Fernleigh, New Road, Bromsgrove, Worcester county, England, have invented certain new and useful Improvements in Spring Seats or Stools, (for which I have obtained Letters Patent of Great Britain, No. 7,202, dated May 15, 1888,) of which the following is a full, clear, and exact specification.

This invention has for its object to provide a novel, desirable, simple, and comfortable spring seat or stool adapted for various purposes, such as to sit or stand upon in a traveling vehicle, where considerable vibration arises by the shaking of such vehicle.

The object of my invention I accomplish by the construction and combination of devices hereinafter described and claimed, reference being made to the accompanying drawings, in which—

Figure 1 is a side elevation of a seat or stool without upholstering embodying my invention; Fig. 2, a vertical sectional view of the same; Fig. 3, a bottom plan view of the top plate, its rubber tubes, and their holding-cores; Fig. 4, a side elevation of a modification, and Fig. 5 a vertical sectional view of the same.

In order to enable those skilled in the art to make and use my invention, I will now describe the same in detail, referring first to Figs. 1, 2, and 3, where the letter N indicates the top plate of the seat or stool, composed of wood or other suitable material which is strong but light. The under side of this plate is provided with a series of rigidly-attached cylindrical cores, $r^3$, over which are fitted or secured the upper ends of rubber tubes R, having their lower ends resting upon and attached to a secondary plate, K, similar in form and material to the top plate. The base-plate H is similar to the other plates, and is connected at its edges with the edges of the secondary plate K by webs M, of textile or other fabric, that will limit the upward movement of the secondary plate under the influence of springs E, placed between and attached to said secondary plate and the base-plate H. The springs E may be spiral, and in addition thereto I may use rubber rings F, to serve as buffers to the secondary plate when depressed by the weight of a person sitting or standing on the top plate.

The base-plate H is provided on its under side with a series of rigidly-attached cores, $r^2$, over which are fitted the upper ends of rubber tubes $r'$, which at their lower ends are adapted to rest directly on the floor of a car or other vehicle, or upon any other support therein.

The supporting and holding cores for the rubber tubes may be of wood or metal and the spiral springs may have similar cores.

By the manifold plates and interposed springs, as explained, I provide a seat or stool of such construction that the vibrations of a vehicle are reduced to a minimum, and a delicate person can thereby travel with comfort.

The device is specially useful as a stand for train-guards and others that necessarily stand in railway-cars.

The rubber tubes $r'$ under the base-plate H, instead of resting directly on a floor, may rest on a separate foundation-plate, S, and instead of spiral springs between the secondary and base plates H and K, I may use rubber tubes, all as shown in Figs. 4 and 5. The latter construction is preferable in that it is more economical. The rubber tubes not only serve as springs to take up vibrations of a vehicle, but they act as buffers, so as to effectually avoid any knocking sounds, in which respect the seat or stool differs from that type having metal springs.

It will be observed that in my improved foot stool or seat the base, secondary, and top plates are of substantially uniform dimensions, and are located in horizontal planes one above the other, and that a series of springs is arranged between the base and secondary plates and between the secondary and top plate. It is evident that for the purposes of my invention, where the weight of the person using the stool or seat is frequently brought to bear solely at one edge or corner portion, the respective series of springs must be distributed upon and around the several plates at or adjacent to the edges or corners thereof in such manner that the top, secondary, and base plates can assume inclined positions relatively to a horizontal plane if the weight of the person be thrown upon one corner or edge. It is also necessary that the springs be fastened or fixed to the plates, whereby such springs serve in themselves to connect or unite the several plates, that the entire stool can be picked up, adjusted, and removed from place to place by the top plate, thereby rendering it unnecessary to employ connecting and securing bolts.

I am aware that seats have heretofore been composed of two frames and interposed springs, and such, therefore, I do not broadly claim.

What I claim is—

As a new article of manufacture, a foot stool or seat consisting of the base-plate H, the secondary plate K, and the top plate, N, all of substantially uniform dimensions and arranged horizontally one above the other, a series of springs secured to and distributed about the under side of the base-plate adjacent to the edges or corners thereof, and two series of springs located, respectively, between and secured to and distributed about the edges or corners of the base and secondary plates, and the secondary and top plates, substantially as and for the purposes described.

In testimony that I claim the foregoing as my own I affix my name in the presence of two witnesses.

JAMES LEA.

Witnesses:
 LEWIS WM. GOOLD,
 GEORGE PRICE.